United States Patent [19]

Walter et al.

[11] Patent Number: 4,912,983
[45] Date of Patent: Apr. 3, 1990

[54] SEALED TENSIOMETER

[75] Inventors: Ronald A. Walter, Wilmington, Del.; Brian D. Richards, Columbus, Ohio

[73] Assignee: E. I. Du Pont de Nemours and Company, Wilmington, Del.

[21] Appl. No.: 326,552

[22] Filed: Mar. 20, 1989

[51] Int. Cl.[4] .......................... G01L 1/22; G01L 5/10
[52] U.S. Cl. .............................. 73/862.65; 73/862.48
[58] Field of Search ...................... 73/862.48, 862.65; 177/211, 229

[56] References Cited

U.S. PATENT DOCUMENTS

Re. 31,312  7/1983  Eddens .
3,280,623  10/1966  Saxl .
3,554,025  1/1971  Andersson et al. .
3,602,866  8/1971  Saxl .
3,805,604  4/1974  Ormond ........................ 73/862.62
3,824,846  7/1974  Andersson .................. 73/862.48 X
4,295,360  10/1981  Fountain .
4,326,424  4/1982  Koenig .
4,478,093  10/1984  Valadier ........................ 73/862.65

FOREIGN PATENT DOCUMENTS 353555  5/1961  Switzerland .

Primary Examiner—Charles A. Ruehl

[57] ABSTRACT

A threadline tensiometer with strain gage sensors sealed inside a protective cover and capable of being located remote from the application of threadline forces.

4 Claims, 3 Drawing Sheets

SEALED TENSIOMETER

BACKGROUND OF THE INVENTION

1. Field of the Invention

This invention relates to a rugged device for measuring tension in a traveling threadline wherein the device is immune to corrosive environments and the measurement is independent of the location of the application of forces on the sensing element of the device.

2. Description of the Prior Art

U.S. Pat. No. 4,821,583, issued Apr. 18, 1989 on the application of B. D. Richards, discloses a tensionmeter for moving threadlines wherein the theadline can be located within a small but flat, ungrooved, area. The Richards device utilizes twin beams of varying thickness positioned inside of two outer shells. Strain gages are attached directly to the beams at locations of minimum thickness. Although the beams are enveloped in two shells, the strain gages are not sealed from the effects of a hostile or corrosive atmosphere.

U.S. Pat. No. 3,280,623 issued Oct. 25, 1966 on the application of E. J. Saxl discloses a load cell for measurement of low forces wherein the cell is a twisted bar with strain gages mounted thereon without provision for a cartridge to contain the strain gages.

U.S. Pat. No. 3,554,025 issued Jan. 12, 1971 on the application of J. Anderson and R.P. Haggstrom discloses a force measuring device of the bending beam type wherein the strain gages are mounted on the main beam.

U.S. Pat. No. 3,602,866 issued Aug. 31, 1971 on the application of E. J. Saxl, discloses a bending beam type of force measuring device wherein strain is concentrated at a weakened point in the beam.

U.S. Pat. No. 4,295,360 issued Oct. 20, 1981 on the application of F. S. Fountain discloses a tension measuring apparatus wherein strain gages are applied to a beam which is primarily responsible for accepting the tension forces to be measured.

U.S. Pat. No. 4,326,424 issued Apr. 27, 1982 on the application of R. G. Koenig discloses a twin beam device wherein the strain gages are merely attached to the primary load-bearing beams.

U.S. Pat. No. Re 31,312 reissued July 19, 1983 on the application of G. R. Eddens discloses a dual beam bridge construction with strain gages mounted to the beams.

Swiss Patent No. 353,555, published May 31, 1961 in the names of M. Green and R. Laimins, discloses a force measuring device of the twin beam type wherein the force to be measured is to be applied through a hole in one beam and onto an inner projection located between the twin beams.

SUMMARY OF THE INVENTION

The present invention provides a force measuring device with a body and a strain gage cartridge wherein the body comprises a mounting end, a moving end, upper and lower flexing walls, and an inflexible hollow core; and the strain gage cartridge comprises a mounting section, a stud section, and a strain measuring section.

The upper and lower flexing walls of the body each have a front end and a back end, with: (i) each front end fixed to the mounting end of the body, (ii) each back end fixed to the moving end of the body, and (iii) the walls spaced apart and parallel with each other.

The inflexible hollow core is fixed to the mounting end of the body and extends into the body, between the upper and lower walls. The core is not in contact with the moving end of the body.

The mounting section of the strain gage cartridge is inflexibly affixed in the hollow core of the body, the stud section is affixed to the moving end of the body in a way to prevent relative transverse movement, and the strain measuring section is joined, at one end, with the mounting section and, at the other end, with the stud section.

The device of this invention finds use in measuring the tension on moving threadlines and, in that use, the device can have, additionally, a direction-changing contact surface affixed to the force application section of the strain gage cartridge; and that direction-changing contact surface can be affixed on the axis with the device or at angle therewith. Arms and other rigid linkages can, also, be affixed to the force application section of the strain gage cartridge, permitting measurement of forces applied remote from the device and at a variety of angles with the axis of the device.

Of special importance in this invention is the provision for utilizing relatively large primary beams to measure applied forces and protecting the strain gages by attaching the gages to a smaller secondary beam which can be sealed from the effects of a hostile environment. By this invention, a rugged force measuring device is provided which accurately measures applied forces; but which utilizes protected gages independent of the primary structure of the device. The gages in the device of the invention can be readily replaced by simple replacement of a cartridge without replacing the primary beams of the device.

DETAILED DESCRIPTION OF THE PREFERRED EMBODIMENT

Figure 1:
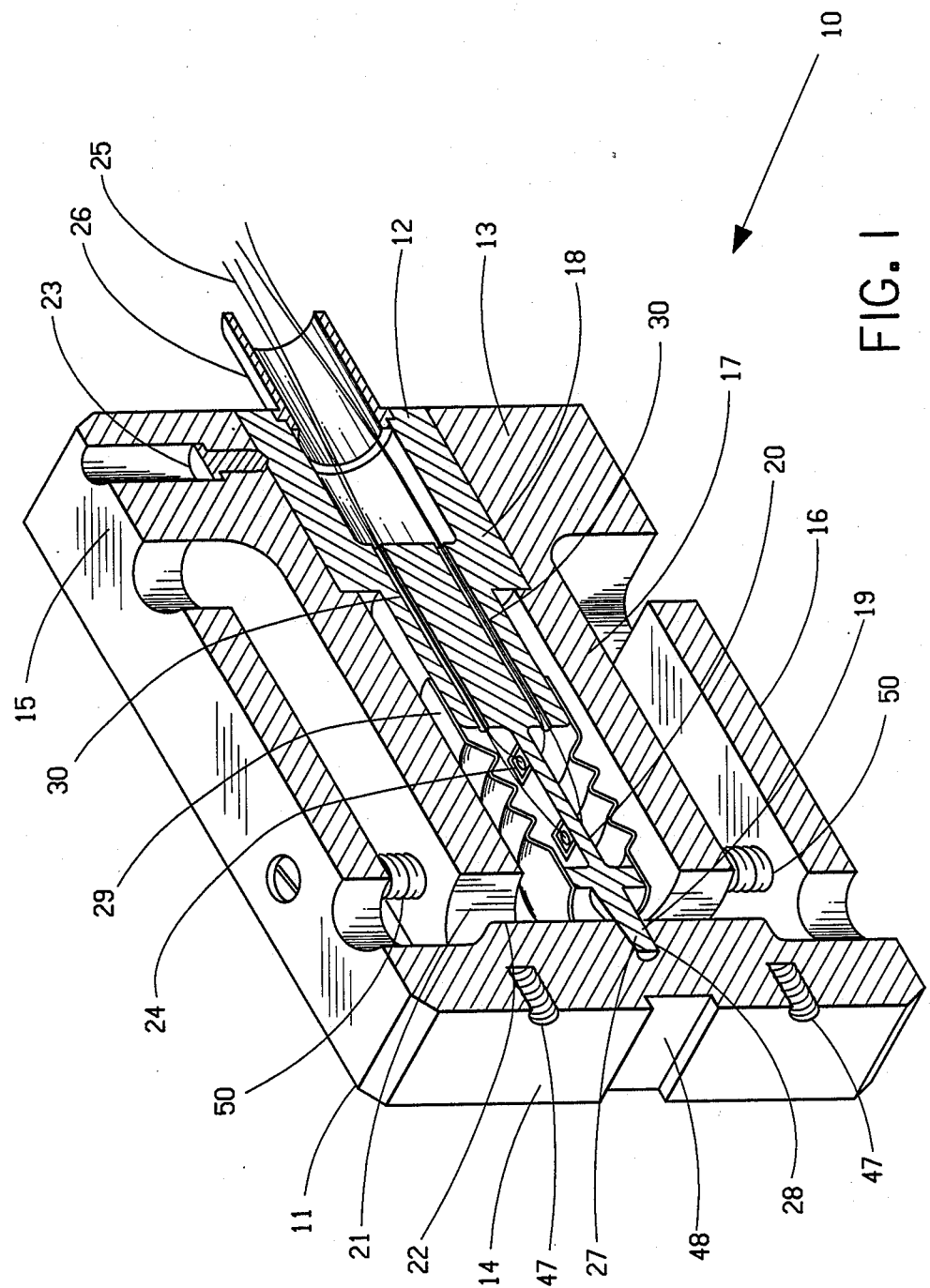
FIG. 1 is a perspective representation, in section, of a force measuring device of this invention.

Referring to the drawings, FIG. 1 shows the force measuring device 10 of this invention with body 11 and strain gage cartridge 12 affixed thereto. The body 11 includes a mounting end 13 and a moving end 14, along with a flexing upper wall 15 and a flexing lower wall 16. The body 11, also, includes inflexible hollow core 17 located between walls 15 and 16. Hollow core 17 is fixed to mounting end 13 and extends into the space bounded by mounting end 13, moving end 14, and walls 15 and 16. Inner face 21 of hollow core 17 is situated near to, but not touching inner face 22 of moving end 14. The body is conveniently of one-piece construction and is machined from 2024-351 aluminum alloy or high tensile stainless steel.

Strain gage cartridge 12 includes a mounting section 18, a stud section 19, and a strain measuring section 20. The cartridge 12 is fixed in hollow core 17 of body 11 by, for example, at least one screw 23 screwed down on mounting section 18. Strain measuring section 20 has strain gages 24 appropriately mounted, with electrical leads 25 attached thereto and extending from cartridge 12 through sealed connector 26. Stud section 19 is affixed, at one end, to strain measuring section 20 and has, at the other end, stud 27. Stud 27 slip-fits into stud-receiving hole 28 in moving end 14 in such a way as to prevent transverse relative movement between stud section 19 and moving end 14.

In order to protect strain gages 24 from hostile or corrosive environment, flexible protective cover 29 surrounds strain measuring section 20 and is sealed to stud section 19 and mounting section 18. Flexible protective cover 29 can be made from stainless steel or nickel or some equivalent material. As an additional protection from the atmosphere, channels 30 through mounting section 18 can be filled with an elastomer or other caulking to permit passage of leads 25 and isolate the strain measuring section 20.

Figure 2:
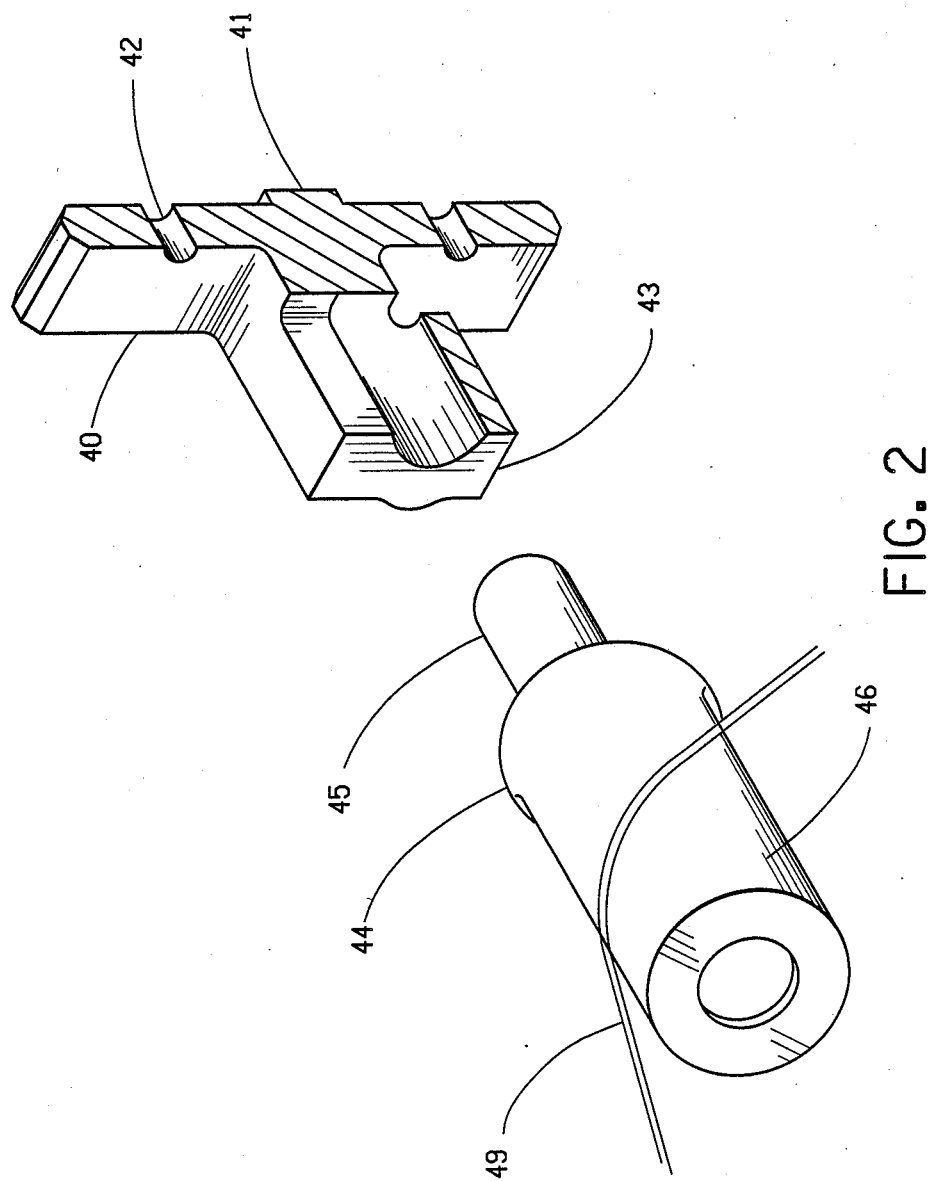
FIG. 2 is a perspective representation of a direction-changing contact surface for the force measuring device of this invention.

Referring now to FIG. 2, there is shown one means for applying force to the force measuring device of this invention. Spindle mounting block 40 is, typically fitted with ridge 41, mounting holes 42, and spindle mounting bracket 43. Spindle 44 is attached to spindle mounting block 40 by means of shaft 45 into spindle mounting bracket 43. Spindle mounting bracket 43 can be, for example, a pinch collar mounting. Direction-changing contact surface 46 is provided in this embodiment as a cylindrical surface around shaft 45, rotatably mounted or not.

Spindle mounting block 40 is affixed to the outer face of moving end 14 by means of bolts (not shown) through holes 42 in the spindle mounting block 40 and into threaded holes 47 in moving end 14. To assure positive and unchanging location, ridge 41 of spindle mounting block 40 is fitted into channel 48 in moving end 14.

In operation, threadline 49 is drawn over or pulled down upon direction-changing contact surface 46 and the force thereby exerted is transferred to the force measuring device of this invention. When force is applied to direction-changing contact surface 46 and moving end 14 is, thereby, pulled in the direction of the force, the range of motion is limited by means of adjustable stops 50, which can be turned to alter the amount of travel possible between moving end 14 and inflexible core 17. The limited motion is necessary for protection of the strain gages 24, specifically, and the strain gage cartridge 12, in general.

Figure 3A:
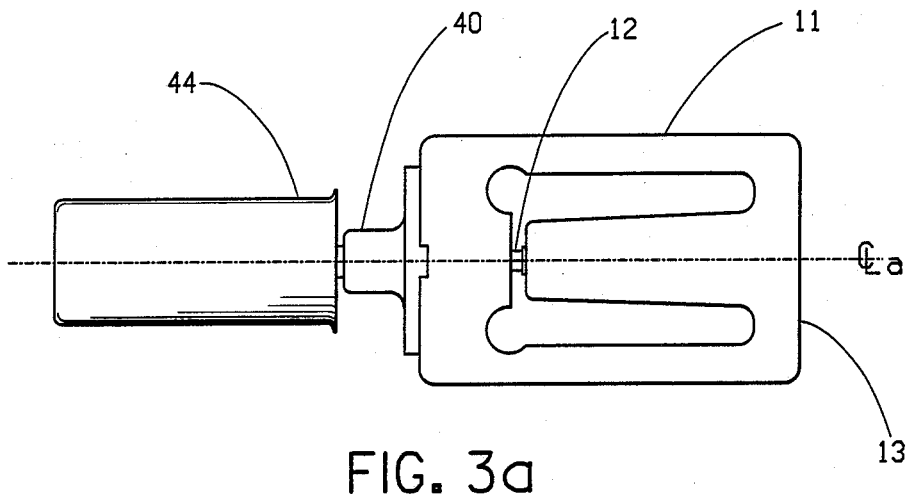
FIGS. 3a and 3b represent an explanatory display of the operation of the device of this invention.
Figure 3B:
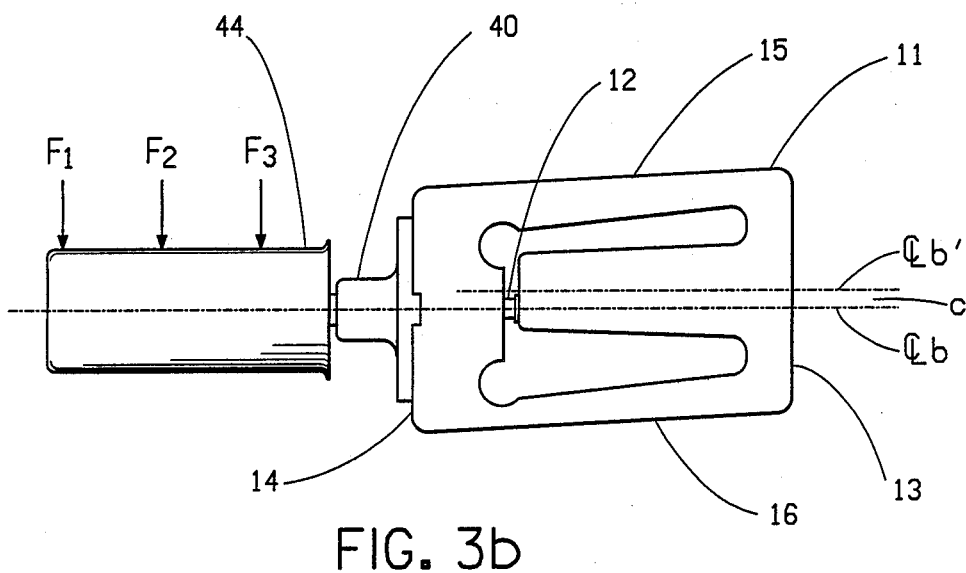

In FIGS. 3a and 3b, the force measuring device of this invention is shown in two different attitudes. FIG. 3a represents a complete embodiment of the force measuring device of this invention in an attitude without application of any force. The axes of body 11, strain gage cartridge 12, spindle mounting block 40, and spindle 44 form a single centerline CLa.

FIG. 3b represents the same complete embodiment in an attitude with force applied to spindle 44. The deflection which is caused by application of the force is greatly exaggerated. Mounting end 13 of body 11 is rigidly fixed and is not moved by application of any forces F. Because mounting end 13 does not move, and because walls 15 and 16 are parallel, any force F causes a translation of the axis, and not a bending of the axis, through the center of the device. Any of forces $F_1$, $F_2$, or $F_3$ cause a deflection of centerline CLb to CLb' (a distance of c) and the centerlines remain parallel. Due to the parallelogram nature of the relationship among mounting end 13, moving end 14, and walls 15 and 16, the degree of deflection for any given force is independent of the point of application of the force. Moreover, lateral force vectors and torque acting on spindle 44 do not affect the measurement.

We claim:

1. A force measuring device comprising:
   (a) body comprising:
      a mounting end;
      a moving end;
      upper and lower flexing walls, each having a front end and a back end, with: (i) each front end fixed to the mounting end of the body, (ii) each back end fixed to the moving end of the body, and (iii) the walls spaced apart and parallel with each other;
      an inflexible hollow core fixed to the mounting end and extending into the body, between the spaced apart walls, and not touching the moving end;
   (b) a strain gage cartridge comprising:
      a mounting section, a stud section, and a strain measuring section, wherein the mounting section is inflexibly affixed in the hollow core of the body, the stud section is affixed to the moving end in a way to prevent relative transverse movement, and the strain measuring section is joined, at one end, with the mounting section and, at the other end, with the stud section;
   (c) overload stops mounted in the upper and lower walls extending inward toward, but not touching, the hollow core.

2. The force measuring device of claim 1 wherein there is, additionally:
   (d) a direction-changing contact surface affixed to the moving end of the body.

3. The force measuring device of claim 1 wherein the strain measuring section is surrounded by a flexible protective cover.

4. A force measuring device comprising:
   (a) a body comprising:
      a mounting end;
      a moving end with a stud-receiving hole therein;
      upper and lower flexing walls, each having a front end and a back end, with: (i) each front end fixed, at right angles, with the mounting end of the body, (ii) each back end fixed, at right angles, with the moving end of the body, and (iii) the walls spaced apart and parallel with each other;
      an inflexible hollow core fixed to the mounting end and extending into the body, between the spaced apart walls, and not touching the moving end;
   (b) a strain gage cartridge comprising:
      a mounting section, a stud section, and a strain measuring section, wherein the mounting section is inflexibly affixed in the hollow core of the body, the stud section is slip-fitted into the stud-receiving hole of the moving end, and the strain measuring section is joined, at one end, with the mounting section and, at the other end, with the stud section;
   (c) overload stops mounted in the upper and lower walls extending inward toward, but not touching, the hollow core.

* * * * *